United States Patent [19]

Durkin

[11] Patent Number: 4,999,767

[45] Date of Patent: Mar. 12, 1991

[54] SYSTEM HAVING CUP OPERATION AL ERROR WARNING FACILITY USING VISUAL INDICATOR AND REAL-TIME CLOCK INTERRUPT ROUTINE

[75] Inventor: Michael D. Durkin, Austin, Tex.

[73] Assignee: Dell Corporate Services Corporation, Austin, Tex.

[21] Appl. No.: 296,719

[22] Filed: Jan. 12, 1989

[51] Int. Cl.⁵ .................... G06F 11/28; G06F 11/32; G08B 5/38

[52] U.S. Cl. ............................ 364/200; 364/221.7; 364/237.2; 364/237.5; 364/239.7; 364/265.5; 364/267; 364/268.2; 364/270.1; 364/232.4; 371/60; 371/62; 340/524

[58] Field of Search ... 364/200 MS File, 900 MS File; 371/16, 16.1, 29.1, 60, 62; 340/524

[56] References Cited

U.S. PATENT DOCUMENTS

| | | | |
|---|---|---|---|
| 4,322,847 | 3/1982 | Dodge et al. | 371/60 |
| 4,611,271 | 9/1986 | Hattori et al. | 371/12 |
| 4,689,766 | 8/1987 | Kent | 364/900 |
| 4,739,309 | 4/1988 | Bräuninger et al. | 340/534 |

Primary Examiner—Archie E. Williams, Jr.
Assistant Examiner—Emily Y. Chan
Attorney, Agent, or Firm—Thomas G. Devine

[57] ABSTRACT

An electronic digital computer has a warning facility for indicating activity and operation, or lack of same, of the central processor in the system. It is done by providing a signal indicative of continuing operation of the central processor to activate an indicator circuit. The indicated circuit utilizes an RC circuit for maintaining a high level through a high comparator when the processor is operational. When the central processor becomes non-operational, the capacitor discharges to a point where a low comparator responds, causing the capacitor to begin charging to its high value. The associated circuits, using this feature, maintain an LED in the active stage until such time as there is no signal indicating continuing operation of the central processor, at which time the LED begins an approximate 50% duty cycle resulting in a blinking indicator.

4 Claims, 6 Drawing Sheets

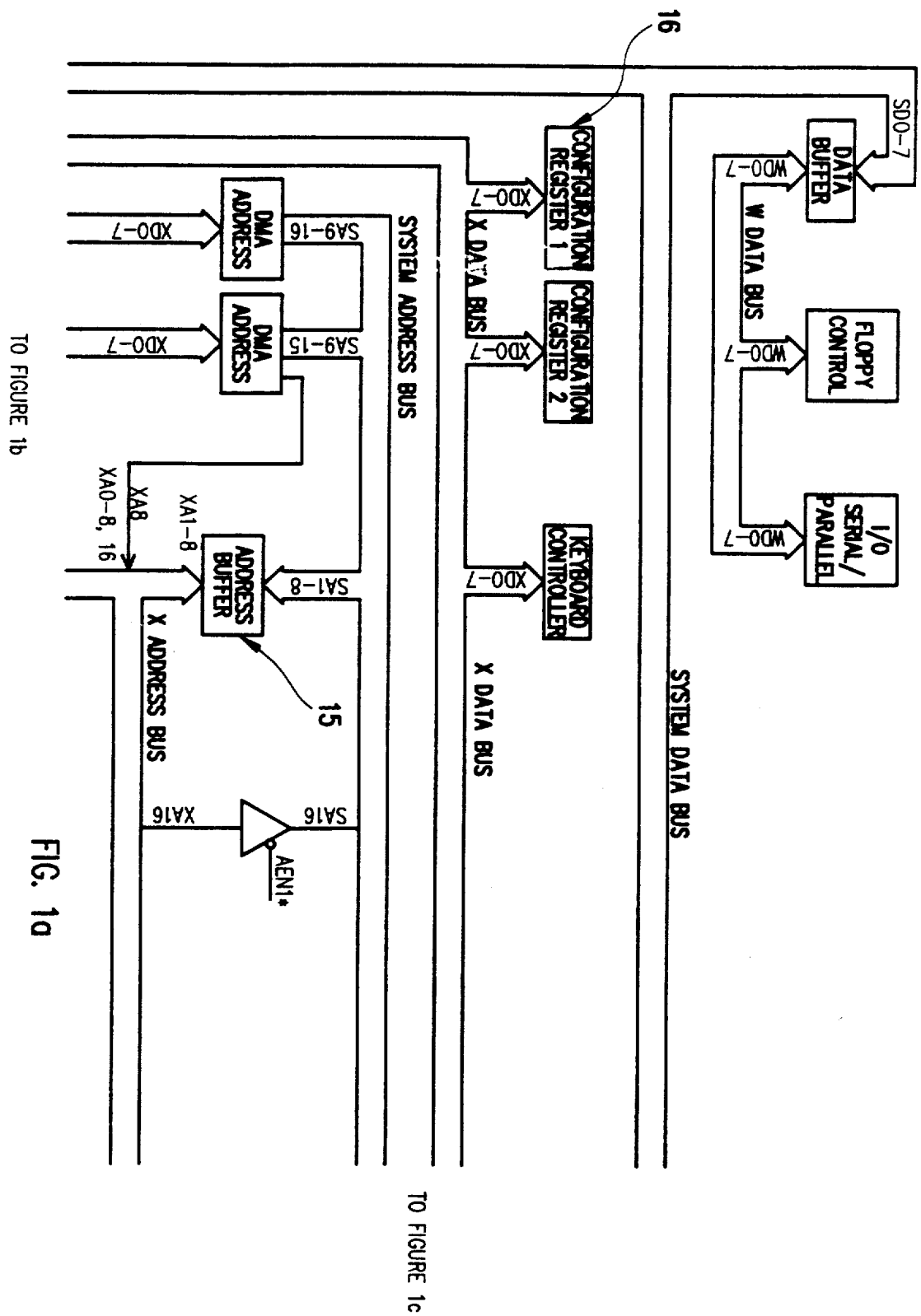

1

SYSTEM HAVING CUP OPERATIONAL ERROR WARNING FACILITY USING VISUAL INDICATOR AND REAL-TIME CLOCK INTERRUPT ROUTINE

BACKGROUND OF THE INVENTION

1. Field of the Invention

This invention pertains to the field of electronic digital computer systems and, in particular, to electronic digital computer systems having warning facilities.

2. Description of the Prior Art

In the early days of electronic digital computers, those computers contained operational registers that were represented by lights for each stage on a control panel. When the central processor was operating, the lights would flash as the registers were activated.

At the present time, it is not common practice to have register stages indicated by individual lights. Therefore, to enable the operator to be warned that the central processor is not operating, special provisions have to be made.

One prior art system manufactured and sold by the assignee of this invention involved a series of light emitting diodes (LED's) that were addressed to provide a pattern of light display when the central processor was active and to present no display when the central processor was not operating.

The present system uses a single LED and no pattern of light display as in the prior art. The present invention, in this preferred embodiment, provides a steady stage output from the LED when the central processor is active and a blinking output from the LED when the central processor is not operational.

BRIEF SUMMARY OF THE INVENTION

An electronic digital computer system has a central processor for performing digital operations. The system has a read-only memory (ROM) for storing commands including those that cause the system to perform a real-time clock interrupt routine. This routine is well-known and is used in this preferred embodiment to enable the invention. However, any processor ready-line or any other signal indicating processor activity could be used as well. The real-time clock interrupt routine provides a periodic pulse which is transmitted to a configuration register where it clears and sets a single bit. The resultant negative-going, bi-level signal is sent from the configuration register to an indicator circuit.

The indicator circuit has an input flip-flop for receiving the bi-level signal from the configuration register. The output of this flip-flop charges a capacitor which is connected to the negative input of a high comparator and the positive input of a low comparator. The positive input of the high comparator is tied to a high reference voltage and the negative input of the low comparator is tied to a low reference voltage. In this preferred embodiment, the output from the configuration register is ordinarily high and goes low when triggered by the real-time clock pulse. The output of the flip-flop is ordinarily high and when it charges the capacitor to a point that is higher than the reference voltage of the high comparator, the output of that comparator goes low, resetting the input flip-flop and causing its output to go low. The charge on the capacitor drops to a point where it is lower than the reference voltage on the low comparator, causing its output to go low which, in turn, sets the input flip-flop. This causes the output of the input flip-flop to go high, again charging the capacitor. As the charge on the capacitor becomes higher, the high comparator again provides a low output which resets the input flip-flop, causing its output to go low.

An output flip-flop also is reset and set by the high and low comparators, respectively. The output of the output flip-flop is gated with the bi-level signal from the configuration register. The output of the gate is then dependant upon the state of the output from this output flip-flop. The on-off rate of this gate is approximately 50-50. The output of the gate is connected to an indicator LED which then blinks when the bi-level signal remains at a constant high level.

When the bi-level signal from the configuration register goes from a high to a low level, the input flip-flop is set providing a high output which, in turn, charges the capacitor and causes a low output from the high comparator. This resets the input flip-flop and the capacitor begins to discharge. However, the timing is such that the incoming bi-level signal again causes the input flip-flop to be set. In this way, the output from the output flip-flop, combined with the input signal, results in a signal that remains at a high level.

The principal object of this invention is to provide a warning facility for a digital computer system to alert the operator that the central processor is not operational.

Another object of this invention is to provide a steady-state light indication when the central processor is operational.

Still another object of this invention is to provide a blinking light indication when the central processor is not operational.

These and other objects will be made evident in the detailed description that follows.

BRIEF DESCRIPTION OF THE DRAWING

FIG. 1a, 1b, 1c and 1d are block diagrams of the electronic digital computer system.

DETAILED DESCRIPTION OF THE INVENTION

The invention is set out herein relates to a warning facility for an electronic digital computer system wherein an indicator light remains steady so long as the central processor is operational. When the central processor becomes non-operational, then the indicator light warns the operator by blinking that there is a malfunction. This invention is set out in the detailed description that follows.

Figure 1B:
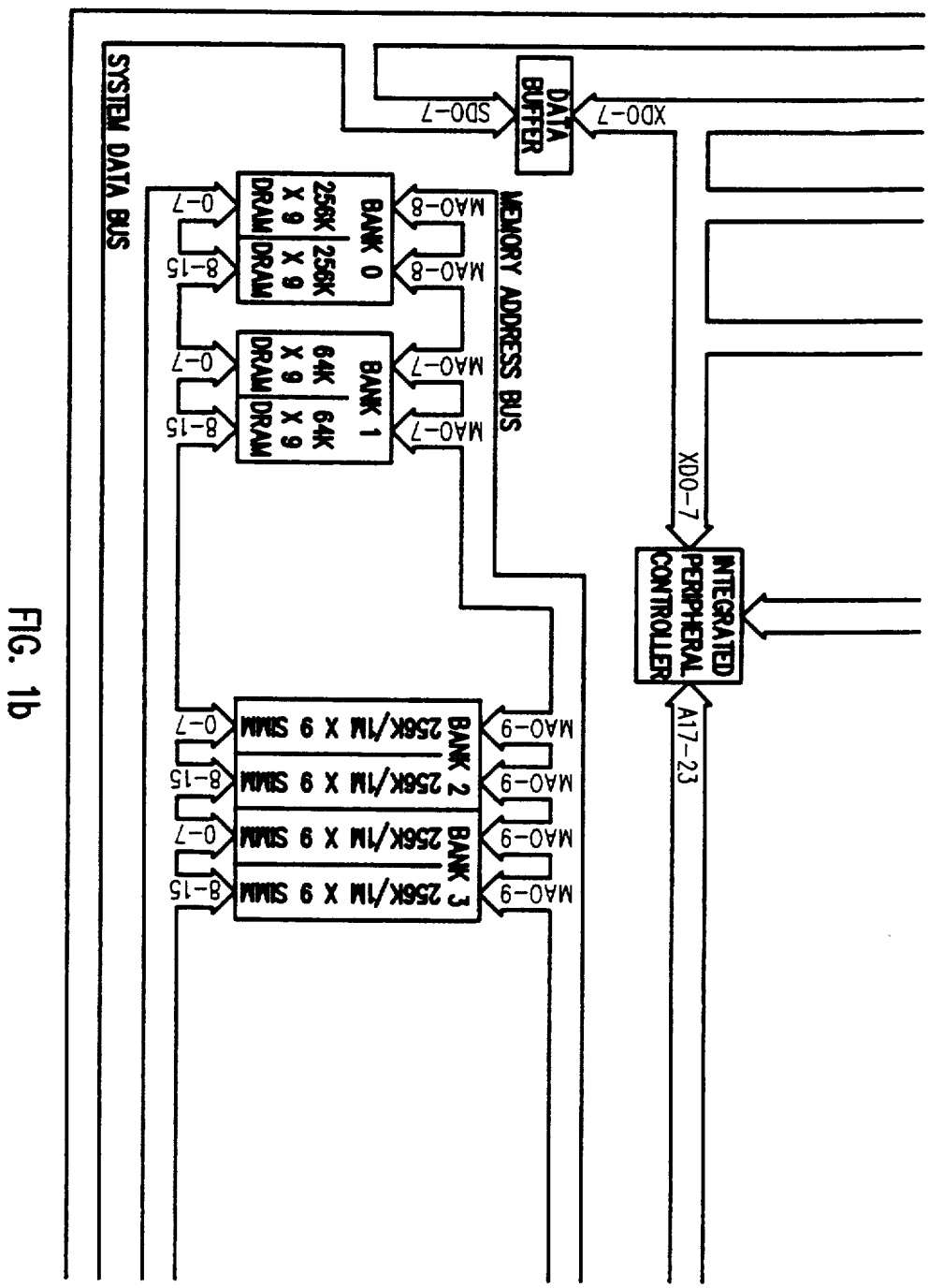
Figure 1C:
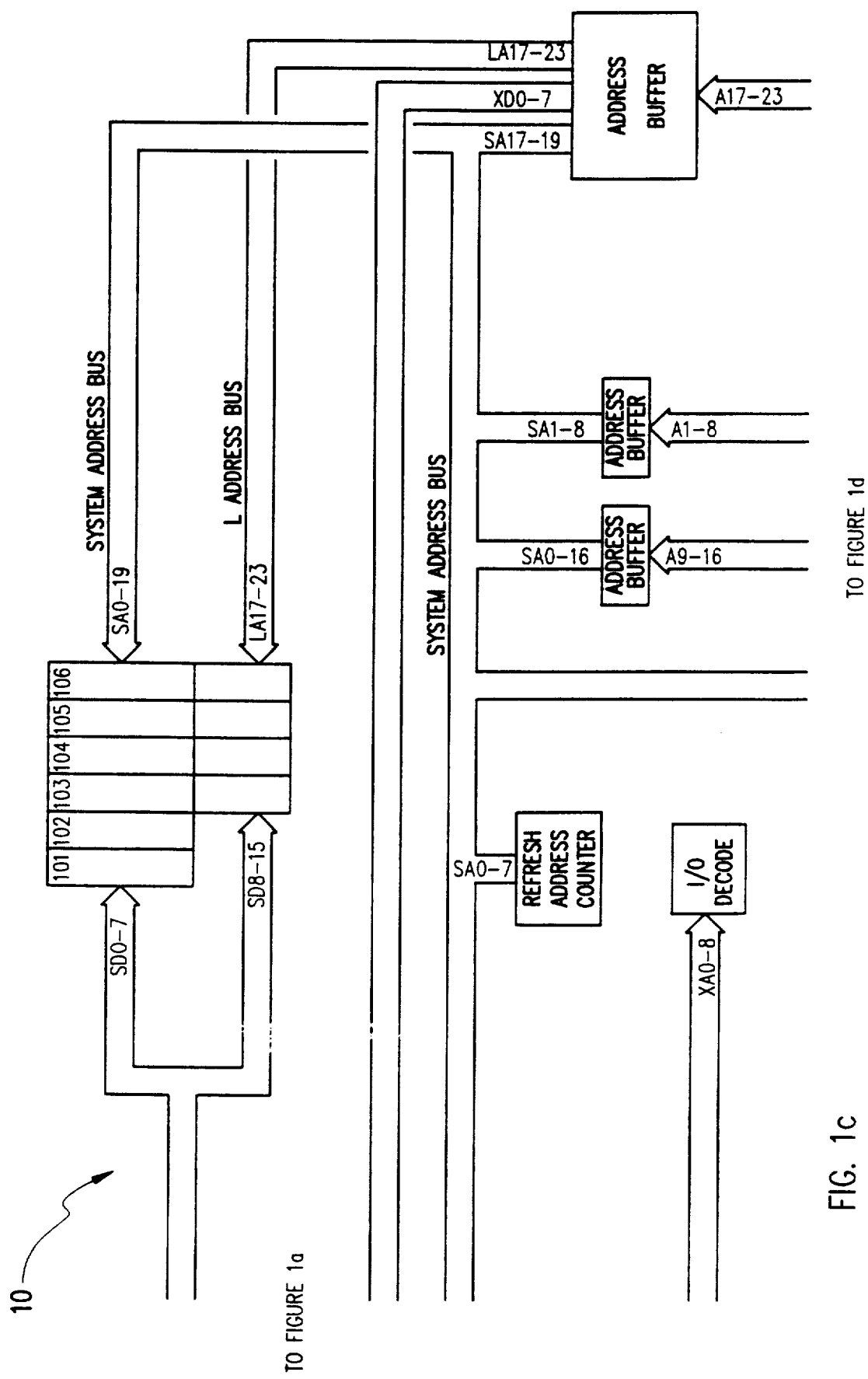
Figure 1D:
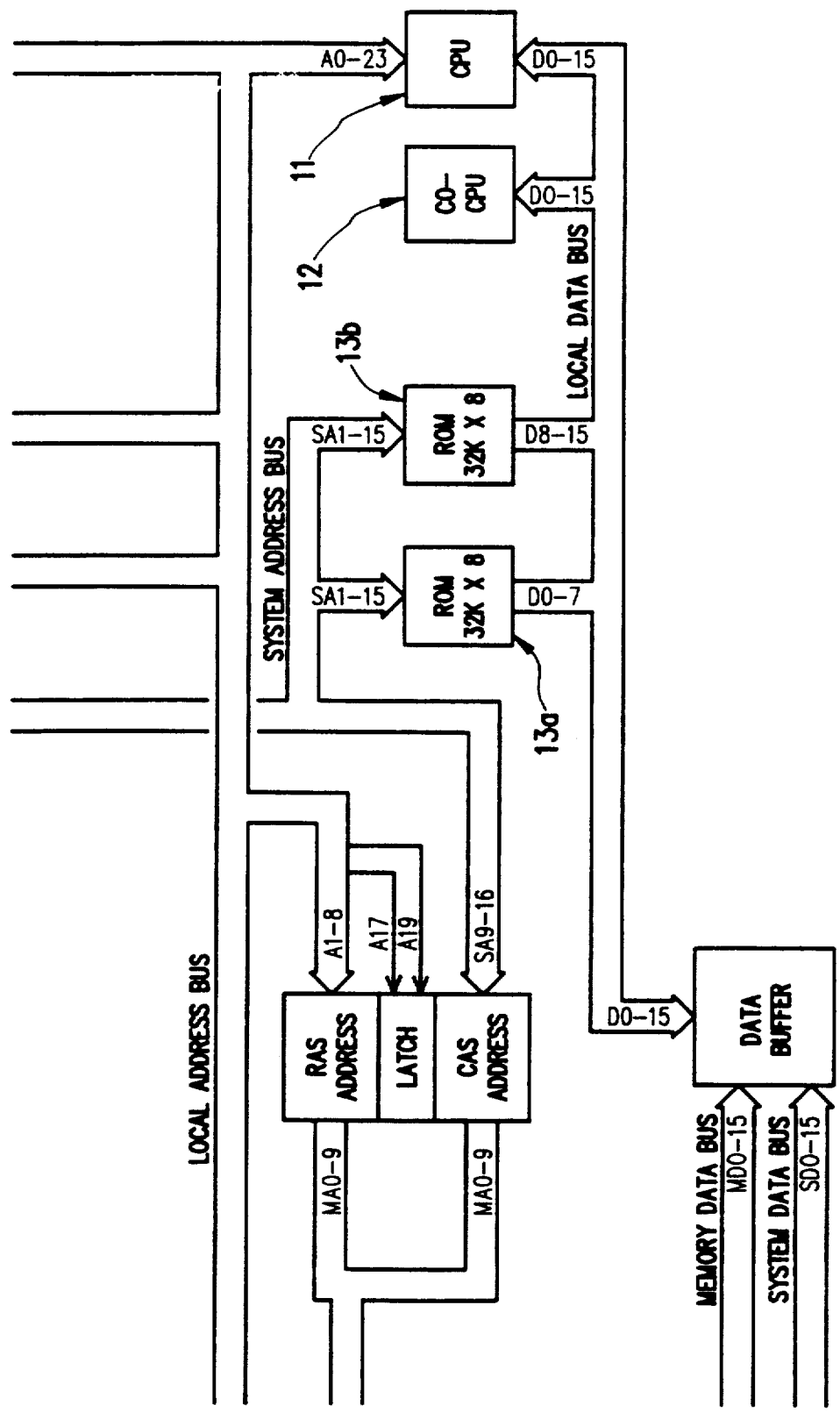

FIG. 1 is a block diagram of an electronic digital computer system. Central processor 11 is shown with coprocessor 12. In this preferred embodiment, these are Intel part numbers 80286 and 80287, respectively. Integrated peripheral controller 15, in this preferred embodiment, is a Chips and Technology Company number 82C206. Integrated peripheral controller 15, provides, among other functions, a real-time clock. The CPU 11, in a well known manner, in conjunction with instructions permanently stored in ROM 13a, 13b, and the real-time clock provides a real-time clock interrupt signal which is sent to a single bit of configuration register 16. The instructions required for providing this interrupt are in ROM 13a, 13b and set out in the Intel "Microprocessor and Peripheral Handbook" Volume 1-Microprocessor, dated 1987.

Configuration register 16 sends out a negative-going pulse in response to the real-time clock interrupt. This negative-going pulse is the SENTRY pulse which is applied to the CP terminal of input flip-flop 31 to indicator circuit 30, shown in FIG. 2.

The Q output of flip-flop 31 has signal SENSAC as an output and is applied through resistor R43, resulting in signal SENCAP, which is applied to the positive plate of capacitor C114, to the negative terminal of high comparator 34 and to the positive terminal of low comparator 36. A voltage divider comprised of series resistors R44, R45 and R46 is formed between Vcc and ground. The positive terminal of high comparator 34 is connected between resistors R44 and R45. The negative terminal of low comparator 36 is connected between resistors R45 and R46. The values of resistance are, of course, selected to provide an appropriate threshold voltage for each comparator 34 and 36. goes above the reference voltage applied at the positive input of comparator 34, then the output signal from comparator 34 which is SENCOMPH goes low, resetting input flip-flop 31. The capacitor C114 had been charged by the signal SENCAP in a positive direction. With flip-flop 31 cleared, its Q output goes low and capacitor C114 begins to discharge. Before it discharges an excessive amount, the SENTRY signal again sets input flip-flop 31 which causes signal SENCAP to again rise, charging capacitor 114. This relationship is evident in FIG. 3, where it is shown that signal SENCOMPH causes signal SENCAP to begin to decline until the SENTRY signal is again applied causing signal SENCAP to rise to a high reference.

The output flip-flop 32 is normally cleared so that its Q output, signal SENLEDNL, is low, assuring a high output from NAND gate 38, keeping LED 35 conducting and providing a constant light signal. If the negative-going signal SENTRY is not applied to input flip-flop 31, then the Q output goes low and capacitor C114 begins discharging. Since flip-flop 31 does not get set, the discharge continues until signal SENCAP falls below the reference voltage applied to low comparator 36. At that time the output signal from comparator 36, SENCOMPL, goes low and is applied inversely to terminal SD of input flip-flop 31, setting that flip-flop. With the flip-flop set, the capacitor C114 again begins its charge toward its maximum positive value.

The output signal from comparator 34, SENCOMPH, provides an inverted input to input RD of input flip-flop 31 and also an inverted input to output flip-flop 32 at terminal RD. The output from low comparator 36 is signal SENCOMPL, which is fed back as an inverted input to terminal SD of input flip-flop 31 and also as inverted input to terminal SD of flip-flop 32. Terminals CP and D of flip-flop 32 are connected to ground and its Q output is tied to Vcc through resistor R49. Signal SENLEDNL, from the Q output of flip-flop 32, provides one input to NAND gate 38. The other input to NAND gate 38 is provided by the SENTRY signal. The output from NAND gate 38, signal FASTLED, is applied to light emitting diode 35.

MODE OF OPERATION OF THE INVENTION

Referring briefly to FIG. 1, the real-time clock interrupt is developed as indicated above, in a well known manner and causes an electronic bi-level negative-going signal from configuration register 16.

Figure 2:
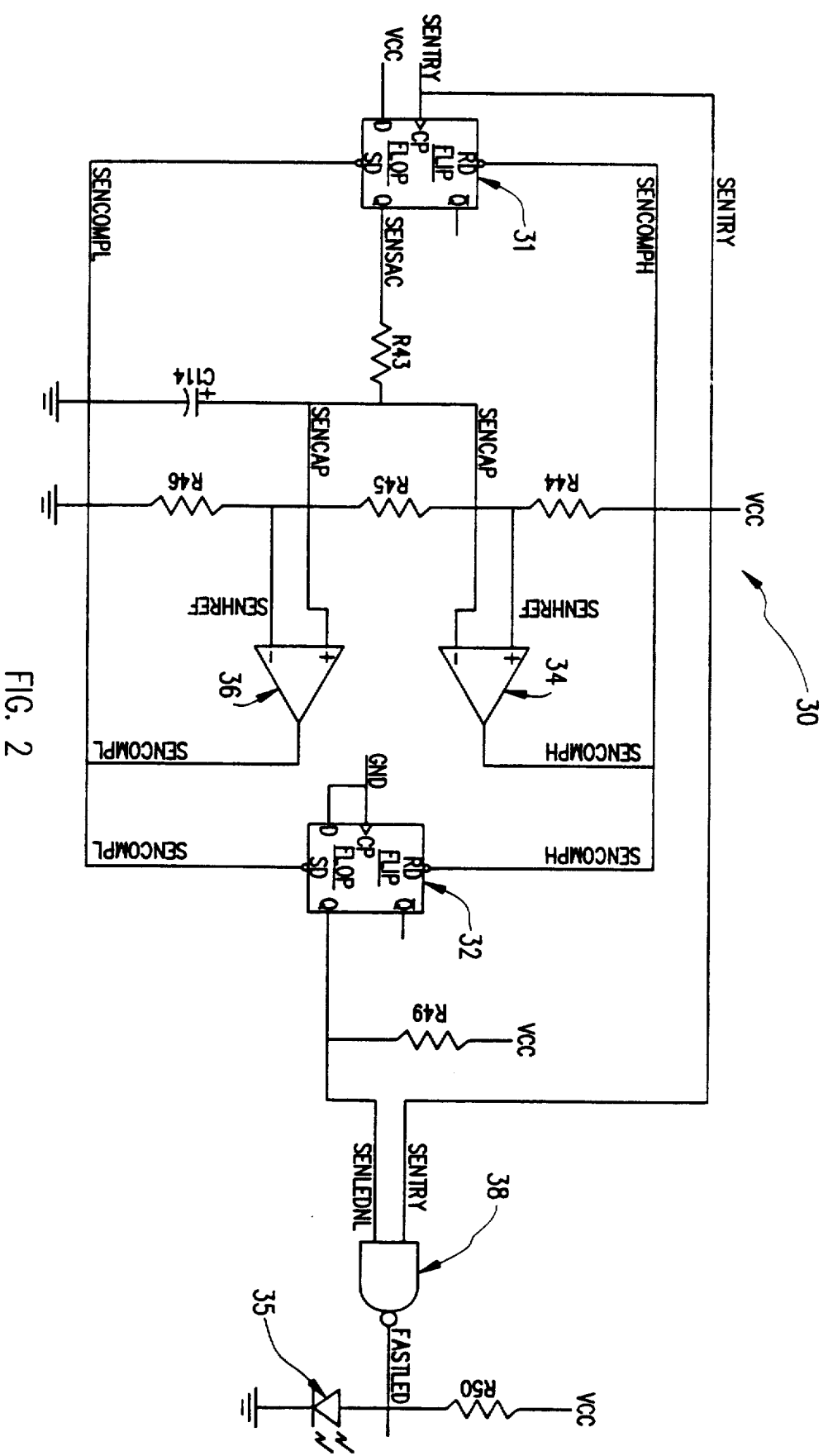
FIG. 2 is a schematic diagram of the indicator circuitry of this invention.

FIG. 2 illustrates this signal which is the SENTRY signal, providing an input to terminal CP which sets input flip-flop 31. The Q output of flip-flop 31, SENSAC, goes high and is applied through resistor R43 as signal SENCAP to the negative input of high comparator 34. When signal SENCAP Low comparator 36 also sets output flip-flop 32, who's Q output then goes high. Since signal SENTRY is ordinarily high, a low output signal FASTLED comes from NAND gate 38, turning off LED 35. However, as capacitor C114 continues charging, it again reaches a high level so that high comparator 34 again provides a low output resetting input flip-flop 31 and output flip-flop 32 which then causes a high output to NAND gate 38. The component values are selected so that the output from NAND gate 38, when no negative-going SENTRY signal is present, provides an approximate 50% duty cycle which causes a visible, blinking LED 35.

Figure 3:
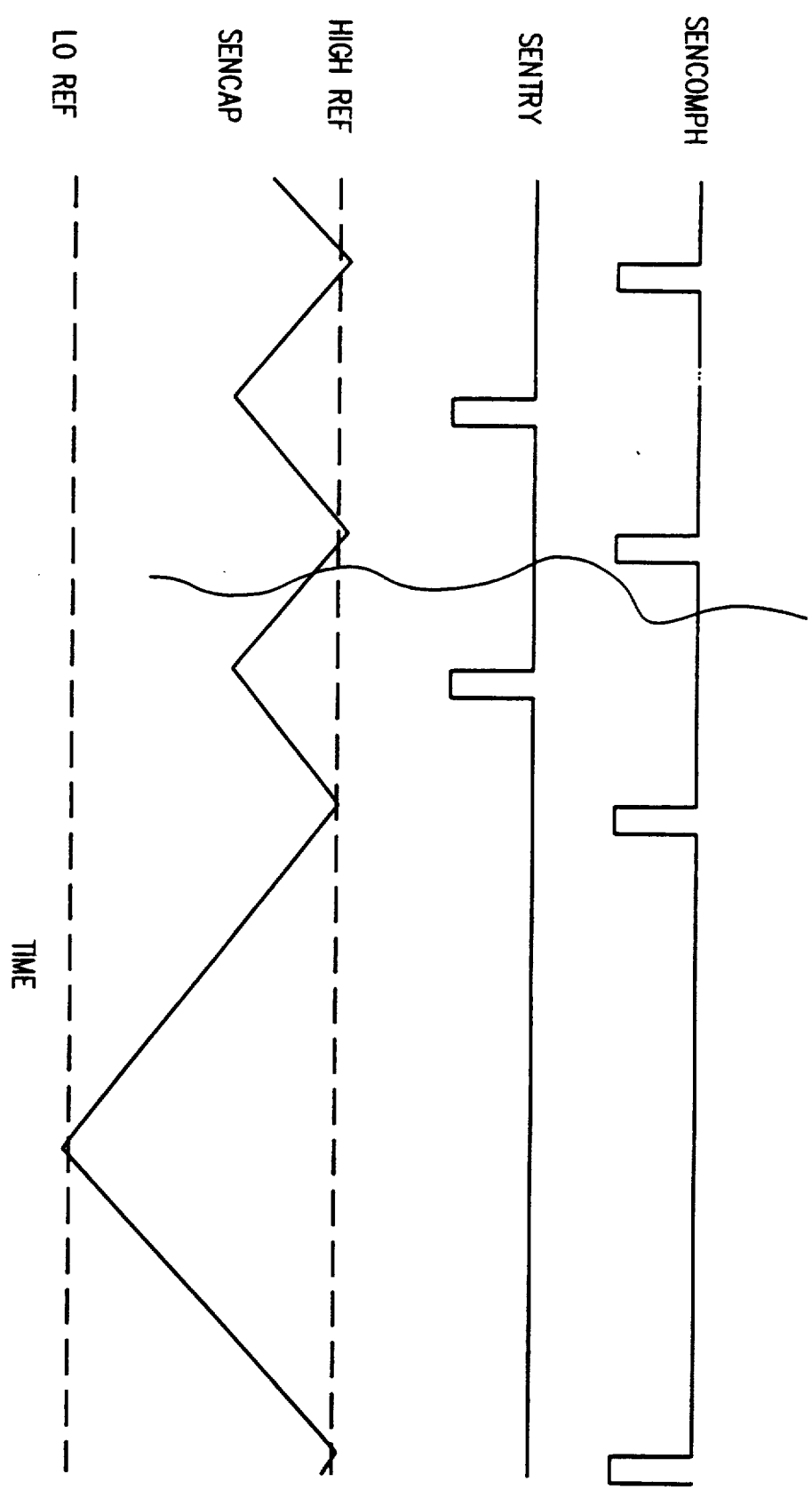
FIG. 3 is a timing diagram illustrating the bi-level electronic signal, the output of the high comparator, and the voltage present on the positive terminal of the indicator capacitor.

FIG. 3, as indicated above, illustrates the relationship between the signals. FIG. 3 is foreshortened for ease of inspection. The SENTRY signal is at a rate of approximately 18/second and is approximately 1 microsecond in duration.

In summary, the real-time clock interrupt routine provides a negative going pulse which activates an indicator circuit to cause that circuit to provide a constant light when CPU 11 is active and operational, and to cause that light to blink when CPU 11, for whatever reason, becomes non-operational. Those skilled in the art understand that various components can be substituted for those shown herein without departing from the spirit and scope of this invention which is limited only by the appended claims.

I claim:

1. An electronic digital computer system having a warning facility, comprising:
   (a) central processing means for performing digital operations and for providing a real time clock interrupt routine which develops a periodic pulse;
   (b) signal generating means, responsive to continuing operation of the central processing means, comprising register means, connected to the central processing means to receive the periodic pulse, to provide a bi-level electronic signal in response thereto, resulting from such continuing operation; and
   (c) indicator means, comprising a visual indicator, responsive to the bi-level electronic signal, with a first state indicating continuing operation of the central processing means and a second state indicating interrupted operation of the central processing means, wherein the indicator means further comprises first detector means for detecting the high level of the bi-level electronic signal, and second detector means for detecting the low level of the bi-level electronic signal, and wherein the first and second detector means comprise a high comparator and a low comparator, respectively, configured so that the high comparator provides a low output signal when the bi-level electronic signal is at the low level, and a high output signal when the bi-level electronic signal is at the high level, and the low comparator provides a low output signal when the bi-level electronic signal is at the high level and a high output signal when the bi-level electronic signal is at the low level, wherein the indicator means further comprises an input flip-flop circuit connected to receive the bi-level electronic signal and to provide a high output signal in response to the electronic signal at the low level, and to provide a low output signal in response to the be-level electronic signal at the high level, and an output flip-flop circuit connected to be reset by the low output of the high comparator and to be set by the low output of the low comparator and having an output that is gaited with the electronic signal.

2. The computer system of claim 1 wherein the input flip-flop is connected to be reset by the low output of the high comparator and to be set by the low output of the low comparator, and wherein the indicator means further comprises a capacitor connected to be charged by the output of the input flip-flop.

3. The computer system of claim 1 wherein the high and low comparators each have a positive and negative input, and the capacitor is connected to a negative terminal of the high comparator and a positive terminal of the low comparator, and the positive terminal of the high comparator is connected to a high reference voltage and the negative terminal of the low comparator is connected to a low reference voltage so that when the charge on the capacitor exceeds the high reference voltage, the output of the high comparator goes low, resetting the input and output flip-flops, and when the charge on the capacitor falls below the low reference voltage, the output of the low comparator goes low, setting the input and output flip-flops.

4. The computer system of claim 3 wherein the indicator means further comprises a light emitting diode (LED) connected to receive the output of the output flip-flop so that when the bi-level electronic signal is present, the light from the LED is steady and when the bi-level electronic signal remains high, the LED assumes a blinking state.

* * * * *

UNITED STATES PATENT AND TRADEMARK OFFICE
CERTIFICATE OF CORRECTION

PATENT NO. : 4,999,767
DATED : 03/12/91
INVENTOR(S) : Michael D. Durkin

It is certified that error appears in the above-identified patent and that said Letters Patent is hereby corrected as shown below:

ON THE TITLE PAGE AND IN COLUMN 1,
IN THE TITLE:

Line 1; change "CUP" to --CPU--, and change OPERATION AL" to --OPERATIONAL--.

Signed and Sealed this

Twenty-eighth Day of July, 1992

Attest:

DOUGLAS B. COMER

*Attesting Officer*     *Acting Commissioner of Patents and Trademarks*